Figure 1:
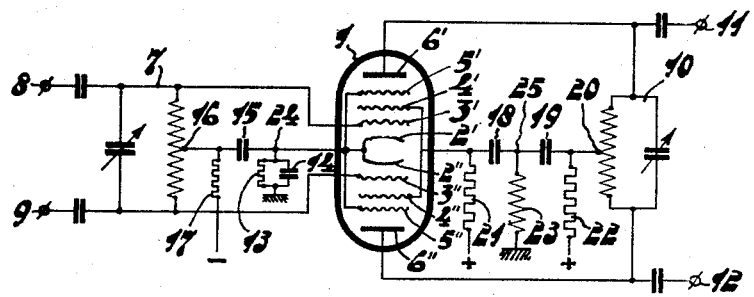

Nov. 21, 1950  M. J. O. STRUTT ET AL  2,530,636

PUSH-PULL HIGH-FREQUENCY AMPLIFYING APPARATUS

Filed Feb. 14, 1947

M.J.O. STRUTT & A VAN DER ZIEL
INVENTORS

BY
AGENT

Patented Nov. 21, 1950

2,530,636

UNITED STATES PATENT OFFICE 2,530,636

PUSH-PULL HIGH-FREQUENCY AMPLIFYING APPARATUS

Maximiliaan Julius Otto Strutt and Aldert van der Ziel, Eindhoven, Netherlands, assignors to Hartford National Bank and Trust Company, Hartford, Conn., as trustee Application February 14, 1947, Serial No. 728,710
In Belgium November 3, 1944

Section 1, Public Law 690, August 8, 1946
Patent expires November 3, 1964

4 Claims. (Cl. 179—171)

This invention relates to a circuit for the transmission of electric ultrahigh-frequency oscillations by means of two discharge systems connected in push-pull and each comprising at least a cathode, an input electrode and an output electrode.

As a rule, push-pull circuits of this kind are in practice realised in such manner that any reaction of the output voltage on the input circuit does not substantially occur. For this purpose, for example, corresponding electrodes of the two discharge systems, such as the two cathodes and, as the case may be, the two screen grids are connected together inside the tube by means of as short a conductor as possible. It is thus ensured that the impedance of the supply conductors for these electrodes is very small relatively to the oscillations occurring in push-pull so that these oscillations can produce but small voltages across the supply conductors.

Nevertheless in these push-pull circuits it remains possible that a strong reaction occurs which, under certain conditions, may even lead to self-oscillating, and this because the conductors by which the said corresponding electrodes are connected to the connecting terminals located outside the tube always have a fairly appreciable inductance. If, now, by some reason or other a co-phase voltage occurs between the output electrodes and earth, this voltage will give rise to a current through the capacities between the output electrodes and the said corresponding electrodes, which current brings about a voltage across the inductance of the common supply conductors for the said corresponding electrodes, said voltages being transferred via the capacities between the corresponding electrodes and the input electrodes to the input circuit with the result that an appreciable reaction occurs.

According to the invention, the reaction caused by a co-phase voltage set up at the output electrodes upon the input circuit is neutralised by means of a bridge connection.

With circuits in which each of the discharge systems comprises, in addition, an auxiliary electrode, for example a screen grid, and in which the two cathodes as well as the two auxiliary electrodes are connected to one another inside the tube, the said neutralisation may be obtained in a very simple manner by connecting the two pairs of mutually connected electrodes to the centres of the input impedance and the output impedance respectively and by placing a suitable chosen inductance between the centres of the input impedance and the output impedance.

The invention will be explained more fully with reference to the accompanying drawing showing, by way of example one embodiment thereof.

Figure 1 shows a push-pull amplifier for ultrahigh-frequency oscillations, a discharge tube 1 containing two amplifying systems comprising cathodes 2' and 2", control grids 3' and 3", screen grids 4' and 4", suppressor grids 5' and 5" and anodes 6' and 6". The cathodes 2' and 2" are connected to each other inside the tube, the suppressor grids 5' and 5" being connected to the cathode in the usual manner. The screen grids 4' and 4" are likewise connected together inside the tube. Between the control grids 3' and 3" there is arranged an input oscillatory circuit 7, to which the oscillations to be amplified are supplied via a pair of terminals 8 and 9. Between the anodes 6' and 6" there is connected an output oscillatory circuit 10 from which the amplified oscillations are derived via a pair of terminals 11 and 12.

The mutually connected cathodes 2' and 2" are connected to earth via a resistance 13 and a condenser 14 connected in parallel. Furthermore, these cathodes are connected, via a condenser 15, to the centre 16 of the circuit 7, a control voltage for automatic volume control being supplied to the two control grids across a resistance 17.

The mutually connected screen grids 4' and 4" are connected, via two series-connected series condensers 18 and 19, to the centre 20 of circuit 10. The required positive biassing voltages are supplied, via resistances 21 and 22, to the screen grids 4' and 4" and the anodes 6', 6" respectively.

According to the invention, the reaction caused by co-phase voltages set up at the anodes 6' and 6" upon the input circuit 7 is neutralised by placing a suitably chosen inductance between the centres 16 and 20 of the circuits 7 and 10. This inductance is designated 23 in Figure 1 and placed between the connection of the condensers 18 and 19.

Figure 2:
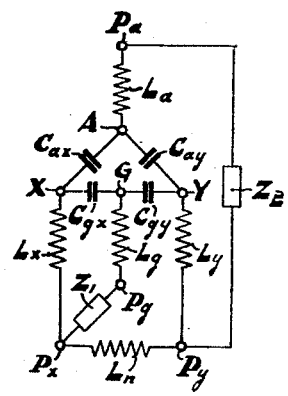

Figure 2 shows a substitution diagram of the circuit shown in Figure 1, from which it appears that a neutralisation of the co-phase reaction may be obtained indeed by taking the said step. In this substitution diagram $Z_1$ is the input impedance, which is constituted by the two parallel-connected halves of circuit 7. The output impedance, which is constituted by the two parallel-connected halves of circuit 10, is denoted by $Z_2$. Points A and G represent the two anodes and the two control grids respectively. Point X and Y each represent a pair of mutually connected corresponding electrodes, for example point X the two cathodes and point Y the two screen grids. The points $P_a$, $P_g$; $P_x$, $P_y$ are the connecting terminals, located outside the tube, of the electrodes corresponding to the indices, whilst the inductances $L_a$, $L_g$, $L_x$, and $L_y$ represent the impedances of the connecting wires between the said electrodes and the connecting terminals. The inductance $L_x$ is constituted, for example, by the parallel connection of the non-common parts in series with the common part of the supply conductors for the electrodes X. The capacities $C_{ax}$, $C_{ay}$, $C_{gx}$ and $C_{gy}$ each represent the two parallel-connected capacities between the electrodes of the two discharge systems which are indicated by the indices. The inductance $L_n$ is the inductance 23 placed between the centres 16 and 20 of the circuits 7 and 10.

In practice the impedances of the capacities shown in the substitution diagram have high values with respect to the impedances of the inductances so that the currents in the different branches are determined almost solely by the capacities. In this case a voltage $E_a$ set up across impedance $Z_2$ brings about a current through impedance $Z_1$, which is approximately equal to $$E_a \cdot jw^3 (L_x C_{ax} C_{gx} + L_y C_{ay} C_{gy} - L_n C_{ax} C_{gy})$$

From this it appears that the said current may be made nought and hence the reaction may be suppressed by giving the inductance $L_n$ a value such as to fulfill the condition.

$$L_n = L_x \frac{C_{gx}}{C_{gy}} + L_y \frac{C_{ay}}{C_{ax}}$$

In the circuit shown in Figure 1 the connecting terminals $P_x$ and $P_y$ correspond to points 24 and 25 so that the inductance $L_n$ is constituted by the natural inductance of the earth connection of point 24 together with the inductance 23. Under certain conditions the natural inductance of the earth connection of point 24 might be so high that the required value of inductance 23 would become negative. In this case a neutralisation independent of frequency can nevertheless be obtained by placing an additional inductance between the cathodes 2' and 2" and point 24 and/or between screen grids 4' and 4" and point 25.

From the substitution diagram it appears that points X and Y may be interchanged so that in the circuit shown in Figure 1 the cathodes and screen grids could alternatively be connected to points 20 and 16, if desired.

What we claim is:

1. A high-frequency amplifier circuit comprising a pair of electron discharge systems arranged in push-pull relation, each system including a cathode, a control grid, a screen grid and an anode, the cathodes of said systems being interconnected, the screen grids of said systems being interconnected, an input impedance connected between the control grids of said systems, an output impedance connected between the anodes of said systems, means coupling said interconnected cathodes to the centerpoint of one of said impedances, means coupling said interconnected screen grids to the centerpoint of the other of said impedances, and an inductance coupled between the centerpoints of said input and output impedances and having a value substantially neutralizing the reaction caused by in-phase voltages set up at the anodes on the input impedance.

2. A high-frequency amplifier circuit comprising a pair of electron discharge systems arranged in push-pull relation, each system including a cathode, a control grid, a screen grid and an anode, the cathodes of said systems being interconnected, the screen grids of said systems being interconnected, a parallel-resonant input circuit including a centertapped inductance connected between the grids of said systems, a parallel-resonant output circuit including a centertapped inductance connected between the anodes of said systems, capacitive means coupling said interconnected cathodes to the centertap in said input circuit, capacitive means coupling said interconnected screen grids to the centertap in said output circuit, and an inductance coupled between the centertaps in said input and output circuits and having a value substantially neutralizing the effect of in-phase voltage set up at the anodes on the input circuit.

3. A high-frequency amplifier circuit comprising a pair of electron discharge systems arranged in push-pull relation, each system including a cathode, a control grid, a screen grid and an anode, the cathodes of said systems being interconnected, the screen grids of said systems being interconnected, a parallel-resonant input circuit including a centertapped inductance connected between the grids of said systems, a parallel-resonant output circuit including a centertapped inductance connected between the anodes of said systems, capacitive means coupling said interconnected cathodes to the centertap in said input circuit, two capacitors connected in series between said interconnected screen grids and the centertap in the output circuit, means to apply a positive voltage to said interconnected screen grids, means to apply a positive voltage for said anodes to the centertap of said output circuit, and an inductance connected between the junction of said series connected capacitors and said interconnected cathodes and having a value substantially neutralizing the effect of in-phase voltage set up at the anodes on the input circuit.

4. An arrangement as set forth in claim 3 further including means to apply an automative volume control voltage to the centertap in said input circuit.

MAXIMILIAAN JULIUS OTTO STRUTT.
ALDERT van der ZIEL.

REFERENCES CITED

The following references are of record in the file of this patent:

UNITED STATES PATENTS

| Number | Name | Date |
|---|---|---|
| 1,768,418 | Oswald et al. | June 24, 1930 |
| 2,002,338 | Buschbeck | May 21, 1935 |
| 2,097,896 | Salzberg | Nov. 2, 1937 |
| 2,119,315 | Buschbeck | May 31, 1938 |
| 2,159,731 | Buschbeck et al. | May 23, 1939 |
| 2,251,629 | Leeds | Aug. 5, 1941 |
| 2,299,366 | Vander Ziel | Oct. 20, 1942 |

FOREIGN PATENTS

| Number | Country | Date |
|---|---|---|
| 114,277 | Australia | Dec. 4, 1941 |
| 552,760 | Great Britain | Apr. 22, 1943 |